United States Patent [19]
Lindquist et al.

[11] Patent Number: 5,816,212
[45] Date of Patent: Oct. 6, 1998

[54] OIL SUPPLY DEVICE

[75] Inventors: Henning Lindquist, Niva; Poul Cenker, Kastrup, both of Germany

[73] Assignee: Man B & W Diesel A/S, Copenhagen SV, Denmark

[21] Appl. No.: 858,559

[22] Filed: May 19, 1997

[30] Foreign Application Priority Data

May 17, 1996 [DE] Germany .................. 196 19 843.7

[51] Int. Cl.⁶ .................................................. F01M 1/00
[52] U.S. Cl. ........................... 123/196 R; 123/196 A; 184/6.24; 210/168; 210/196; 210/407
[58] Field of Search ................ 123/196 R, 196 AB, 123/196 A; 184/6.24; 210/168, 196, 312, 407

[56] References Cited

U.S. PATENT DOCUMENTS

| | | | |
|---|---|---|---|
| 4,496,460 | 1/1985 | Haarstad et al. | 210/168 |
| 5,071,567 | 12/1991 | Corcelle et al. | 210/407 |
| 5,395,519 | 3/1995 | Miller | 210/168 |
| 5,499,693 | 3/1996 | Widenhorn | 184/6.24 |
| 5,565,094 | 10/1996 | Zoch et al. | 210/168 |
| 5,635,625 | 6/1997 | Tsunoda | 123/196 R |

FOREIGN PATENT DOCUMENTS

| | | | |
|---|---|---|---|
| 3742455 | 6/1989 | Germany | 123/196 A |
| 2015354 | 6/1994 | U.S.S.R. | 13/196 A |

*Primary Examiner*—John T. Kwon
*Attorney, Agent, or Firm*—Jones, Tullar & Cooper, P.C.

[57] ABSTRACT

In an oil supply device for a machine having different categories of oil consumers, to which respectively one supply loop provided with at least one pump is provided, it is possible to achieve a simple structure and advantageous operating costs in that all supply loops can be provided with oil from a common oil tank, that at least one supply loop having a self-cleaning filter provided with an outlet for oil sludge, and that a separating device is provided, which can be charged at least with the oil sludge from each self-cleaning filter and which has a clean oil outlet terminating in the oil tank.

27 Claims, 2 Drawing Sheets

OIL SUPPLY DEVICE

FIELD OF THE INVENTION

The present invention relates to an oil supply device for a machine having different categories of oil consumers, to which respectively one supply loop provided with at least one pump is assigned; in particular to an oil supply device for a machine with lubrication points, which are to be supplied with lubricating oil, and with hydraulic units, which are to be supplied with hydraulic oil, such as a reciprocating machine, preferably a large Diesel engine.

BACKGROUND OF THE INVENTION

In known arrangements of the above mentioned type, each category of oil consumers is assigned its own supply system with its own oil and own oil tank. For example, in a large reciprocating engine with hydraulically actuable injection pumps, injection valves, outlet valves, etc., a lubricating oil system is provided, as well as a completely separate hydraulic oil system. As a rule, the lubricating oil system is provided with a so-called oil sump situated in the lower area of the machine, which is connected with an assigned tank by means of a return flow line. In order to assure that no contamination of the lubricating oil with hydraulic oil takes place, all hydraulic units are connected with a hydraulic oil tank by means of return flow lines. The result of this is that practically the same pressure must prevail at all units, which is undesirable. The use of separate oil supply systems therefore is clearly expensive and awkward.

OBJECTS AND SUMMARY OF THE INVENTION

Based on the foregoing, it is therefore the object of an present invention to improve an arrangement of the type mentioned at the outset by simple and cost-effective means in such a way that a simple structure and advantageous operating costs are achieved.

This object is attained in accordance with the present invention in that all supply loops can be provided with oil from a common oil tank, that at least one supply loop is provide with a self-cleaning filter having an outlet for oil sludge, and that a separating device is provided, which can be charged at least with the oil sludge from each self-cleaning filter and which has a clean oil outlet terminating in the oil tank.

These measures assure that only one type of oil is required for the different applications. It is nevertheless assured that in connection with the applications requiring a high degree of purity of the oil, oil is available which has been filtered by means of the self-cleaning and therefore fine-mesh filter and has a correspondingly high degree of purity. Oil of this type is suitable, for example, for the supply of hydraulic units. Since at least a portion of the entire oil throughput through all supply loops is permanently cleaned with the aid of the self-cleaning filter, a good oil quality also results in an advantageous manner, which relieves the filter devices. Since the oil sludge accumulating at the self-cleaning filter is separated into impurities and clean oil, it is furthermore assured that the impurities can be disposed of without problems and no noticeable oil loss occurs. A further, very special advantage of the measures in accordance with the present invention can be seen in that no additional efforts for mixing the oil for different supply loops are required. In connection with a reciprocating engine with an oil sump assigned to the lubricating oil it is therefore possible in an advantageous manner for the return and leak oil of the hydraulic supply loop to simply run off into the oil sump. Individual return flow lines can be omitted in an advantageous manner. At the same time it is assured by this that it is possible to set different pressures, which are therefore optimally adapted to the respective conditions at the individual hydraulic units.

A supply loop leading to the hydraulic units can in this way be suitably embodied in a cascade manner, having a self-cleaning filter and a high-pressure pump, of a supply loop provided with a low-pressure pump and leading to lubricating points. It is assured by means of this that the high-pressure pump need not be free-aspirating, but is dependably filled by means of the upstream low-pressure pump, because of which the generation of cavitation is effectively precluded. It is additionally assured that the self-cleaning filter is not subjected to the entire oil throughput of all supply loops, but only to the oil throughput of the respectively assigned supply loop. A comparatively small structural size of the filter is therefore sufficient in an advantageous manner.

It is possible in an advantageous manner to provide a filter having a larger mesh size than the self-cleaning filter located upstream of the branching of the supply loop provided with a self-cleaning filter. This results in an advantageous manner in filtering of the entire volume flow, which also represents a pre-filtering with respect to the subsequent fine filtering to be provided by the self-cleaning filter, which is eased by this, and the self-cleaning filter is thereby relieved. In some cases it can be advantageous to embody the pre-filter also as a self-cleaning filter, by means of which an overall higher oil quality is achieved.

The separating device can usefully have a sediment separator, preferably in the form of a centrifuge, with an upstream located pump. High hourly outputs and great freedom from maintenance, as well as an excellent degree of separation efficiency, result from this in an advantageous manner.

In a further development of the generic measures it is possible to provide a sludge container, which can be acted upon by means of the disposal outlet of at least one self-cleaning filter and which is equipped with a floating switch, by means of which an outlet at the bottom of the sludge container can be connected to the inlet of the sediment separator alternatively to a connection to an outlet at the bottom of the oil tank. It is assured by this that material is continuously supplied to the sediment separator, because of which dry running is dependably prevented. It is nevertheless assured that mixing of the oil sludge leaving the self-cleaning filter with the contents of the oil tank is prevented. Since on the other hand the contents of the oil tank are also passed through the sediment separator, an overall high oil quality results, because of which the filter devices are relieved.

Further practical developments and advantageous embodiments of the generic measures are taken from the following description of an example by means of the drawings.

DESCRIPTION OF THE PREFERRED EMBODIMENT

Figure 1:
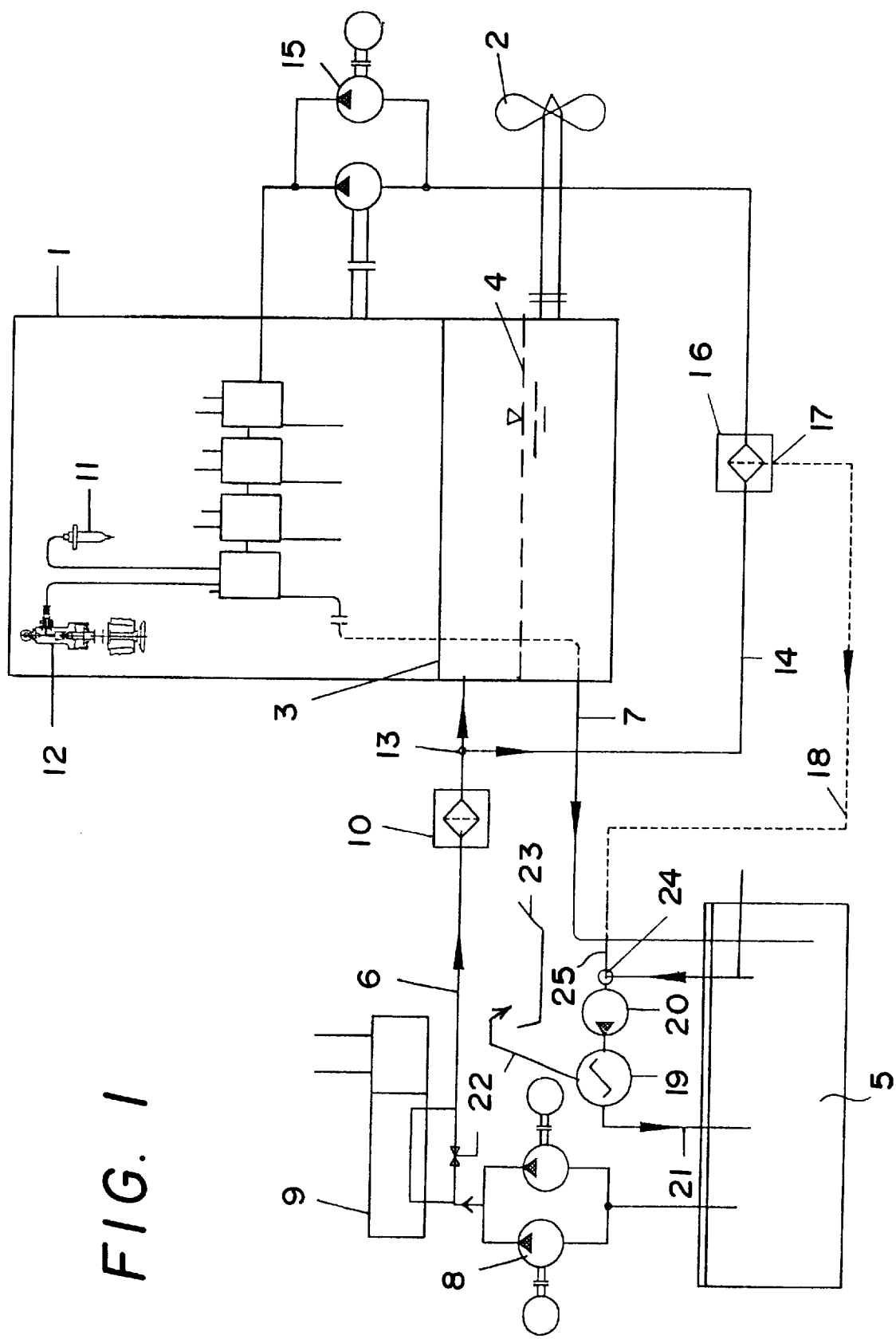
FIG. 1 shows a reciprocating engine with the associated oil supply system according to the present invention.

The reciprocating engine 1 represented in FIG. 1 can be a large Diesel engine used for driving a vessel, as indicated by a propeller 2. The basic structure and mode of operation of such reciprocating engines are known per se and therefore do not require further explanation here.

Reciprocating engines of the type here addressed contain a multitude of devices which are supplied with lubricating oil for lubrication and/or cooling. For example, the crank mechanism is disposed in an oil pan 3 located in the lower part of the engine, the oil pan being charged with lubricating oil. Other lubricating points, such as bearings, etc., are separately supplied with lubricating oil. The lubricating oil exiting as leak oil in the process runs off into the oil pan 3. The oil which is present in the latter is called the oil sump 4.

An appropriate supply loop is provided for supplying all lubricating oil consumers with lubricating oil and has an outflow branch 6 from the oil tank 5 and a return flow branch 7 leading back from the oil sump 4 to the oil tank 5. The outflow branch 6 contains two low-pressure pumps 8, disposed parallel with each other, with associated drive motors for performing the conveyance of the oil, as well as a cooling device 9 for cooling the oil and a filter 10, by means of which coarse impurities can be filtered out. The filter 10 can have a mesh size of 50 $\mu$. The return flow branch is embodied as an unpressurized drain line.

The instant reciprocating engine 1 also contains devices which can be actuated by means of hydraulic units. An injection nozzle 11 and a cylinder-piston unit 12 associated with an exhaust gas outlet valve are indicated by way of example. These hydraulic units are charged with hydraulic oil under the required pressure by means of an associated supply loop. In accordance with the present invention, the oil is taken from the lubricating oil. Accordingly, the supply loop for the hydraulic units is embodied as a cascade of the supply loop for the lubricating oil consumers, i.e. it branches off it and terminates in it again.

To this end a branch 13 is provided in the outflow branch 6 which extends from the oil tank 5 downstream of the filter 10, where the supply loop assigned to the hydraulic aggregates branches off. The branch 13 is provided with two parallel disposed high-pressure pumps 15 with respectively assigned drive devices and with a filter 16. The desired distribution of the amounts can be set at the branch 13. In this case the low-pressure pumps 8 act as supply pumps for the high-pressure pumps 15, which are accordingly dependably filled. The filter 16 has a smaller mesh size than the filter 10, which in this respect acts as a prefilter. In the course of tests a mesh size between 5 $\mu$ and 10 $\mu$, preferably 6 $\mu$, has been shown to be sufficient for assuring an oil quality which is suitable for hydraulic use.

The leak oil and/or so-called return oil leaving the hydraulic units supplied with high-pressure oil can run off freely into the oil sump 4, the same as the lubricating leak oil, as indicated by a broken line in FIG. 1, and therefore returns together with the lubricating oil to the oil tank 5. Accordingly, on the return side the hydraulic oil supply loop terminates, starting at the oil sump 4, in the lubricating oil supply loop. The partial volume flows of the lubricating oil and the hydraulic oil are accordingly united into a total volume flow downstream of the oil sump 4 and upstream of the branch point 13. Since the partial volume flow assigned to the hydraulic oil is continuously cleaned by the fine-mesh filter 16, and this partial volume flow is united with the other partial volume flow starting at the oil sump 4 downstream to the branch point 13, an improvement of the degree of purity of the entire oil supply results.

The fine-mesh filter 16 is embodied as a self-cleaning filter. The structure and mode of operation of such filters is known per se. As a rule, such filters operate in such a way that a backwash of the impurities takes place and a sludge outlet 17 for the sludge, which is very dirty and is formed by the backwash, here called oil sludge, is provided. A disposal line 18 is connected with the sludge outlet 17. The oil sludge exiting the filter 16 and containing the backwashed impurities is subsequently separated into clean oil and impurities. The clean oil is returned to the oil tank 5. The separated impurities are collected and then removed, for example, they are stored in a waste dump or provided to a combustion installation, etc.

A separating device is provided for executing the separation, which contains a sediment separator 19, for example in the form of a centrifuge, and a pump 20 upstream of the latter. The drive devices associated with these units as a matter of course have been left out of the drawings for reasons of clarity. The sediment separator 19 has a clean oil outlet 21 terminating in the oil tank 5, and a sediment outlet 22, which can lead to a storage reservoir 23, into which the separated impurities are placed.

A reversing device 24 is provided at the suction inlet of the pump 20 of the separating device, to which the disposal line 10 coming from the narrow-mesh filter 16 and an aspirating connector 25 projecting into the oil tank 5 are connected. The disposal line 18 and the aspirating connector 25 can be selectively connected with the aspirating inlet of the pump 20 of the separating device by means of the reversing device 24. As long as sufficient oil sludge is accumulated, the aspirating connector 25 is passivated. If too little oil sludge arrives, the aspirating connector 25 is activated. Dry running of the pump 20 and the sediment separator 19 is prevented by means of this and at the same time it is achieved that the contents of the oil tank 5 are also cleaned by means of the separating device.

Figure 2:
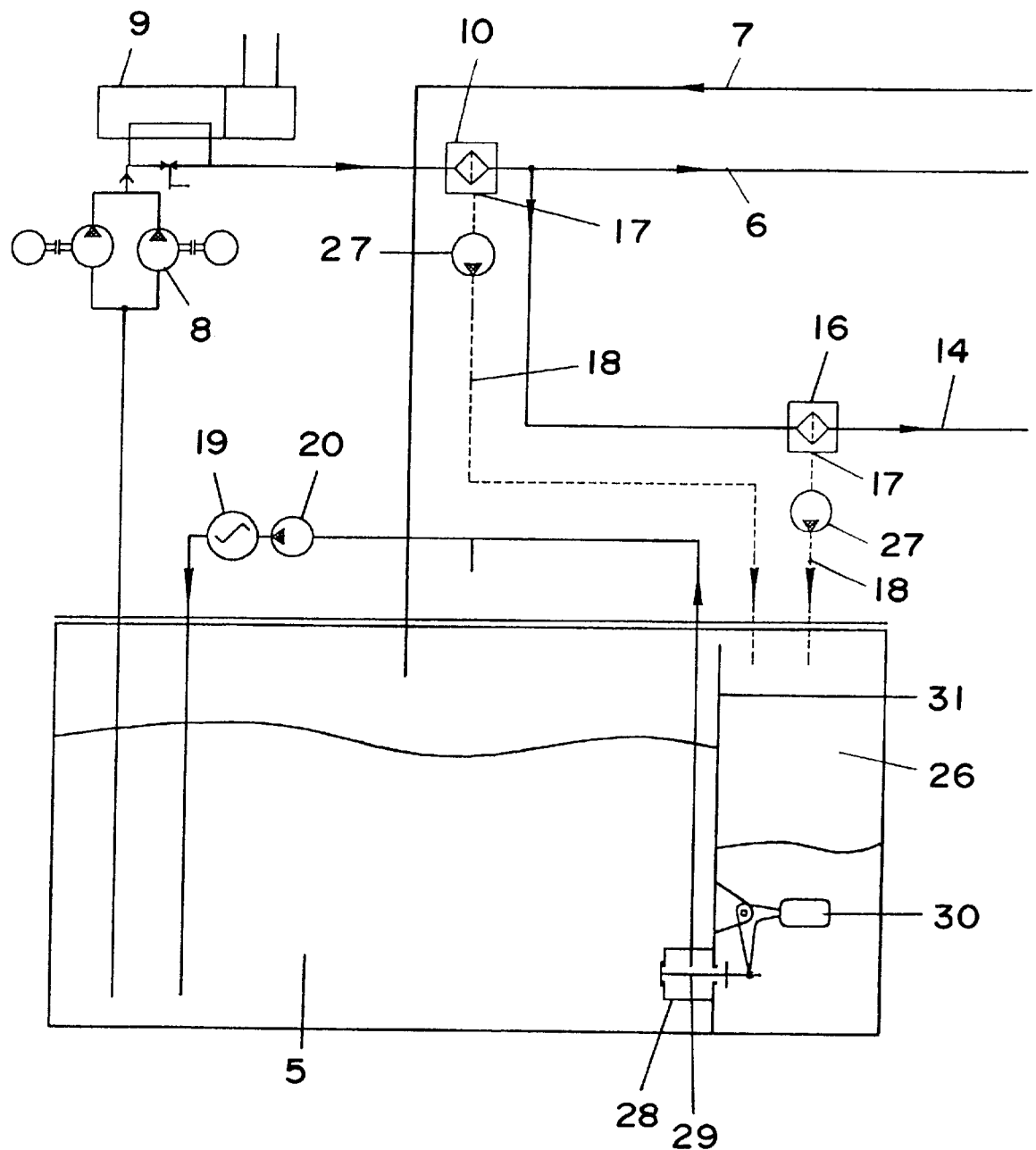
FIG. 2 represents a variant of FIG. 1.

In the embodiment of FIG. 1, only the narrow-mesh filter 16 is embodied as a self-cleaning filter. However, it would also be conceivable to embody the coarse filter 10, which is situated farther upstream and functions as a pre-filter, as a self-cleaning filter. This can improve the function and simplify maintenance. With an embodiment of this type the separating device can be charged with the oil sludge accumulating in both self-cleaning filters. An example of this is represented in FIG. 2, which will be described further hereinafter. It would also be conceivable to provide a narrow mesh filter already upstream of the branch point 13. In this case a filter disposed in the area of the hydraulic oil cascade could be omitted.

However, the entire volume flow passes through a filter located upstream of the branch point 13, so that a correspondingly large structural size results.

The principal structure and mode of operation of the arrangement in accordance with FIG. 2 correspond to the above described example. Therefore the same reference numerals will be used for like elements.

As already mentioned above, both filters 10 and 16 are designed as self-cleaning filters in the example based on FIG. 2. Accordingly, both filters have sludge outlets 17, to which disposal lines 18 are connected. In the embodiment in accordance with FIG. 2, the accumulated oil sludge is collected in a sludge container 26, in which the disposal lines 18 terminate. The latter are accordingly equipped with conveying pumps 27. In the embodiment in accordance with FIG. 1, the pump 20 of the separating device simultaneously functions as such a conveying pump. The separating device, which here also contains a sediment separator 19 and a pump 20 upstream thereof, can be selectively connected with the sludge container 26 and the oil tank 5. To this end the pump 20 is provided with an aspirating connector 25, which is connected to an aspirating chamber 28, which is embodied as a flow connection, disposed close to the bottom, between the oil tank 5 and the sludge container 26.

The aspirating chamber has an inlet on the side of the oil tank and an inlet on the side of the sludge container. These inlets can be alternatingly opened and closed by means of a dual valve 29. The dual valve 29 can be actuated by means of a floating switch 30 disposed in the sludge container 26 in such a way that the opening of the aspirating chamber 28 on the side of the sludge container is opened and the other opening is closed as long as sufficient oil sludge is present in the sludge container 26, and vice versa. Dry running in the area of the separating device is again prevented, and at the same time the contents of the oil tank 5 are cleaned when passing through the separating device, because of which the filter devices are relieved.

In the embodiment of FIG. 2 the oil tank 5 and the sludge container 26 are placed into the same housing and are only kept apart by a separating wall 31. An overflow gap is here provided at the upper end of the separating wall 31, by means of which overfilling of the sludge container 26 is prevented. However, it would of course also be conceivable to provide two containers separated from each other for forming the oil tank 5 and the sludge container 26, which are connected, for example, by a pipeline disposed on the bottom, and which can be provided with two oppositely actuable blocking members, between which a connecting opportunity for the aspirating connector 25 can be provided.

We claim:

1. An oil supply device for a machine having lubricating oil consumers and hydraulic oil consumers, comprising:
    a common oil supply for supplying oil to all consumers;
    at least one oil supply loop including a self-cleaning filter connected to said common oil supply and to one of the consumers, said self-cleaning filter having an outlet for oil sludge; and
    a separating device connected to said oil sludge outlet of said self-cleaning filter, said separating device having a clean oil outlet connected to said common oil supply.

2. The oil supply device as defined in claim 1, wherein said machine is a diesel engine, and wherein said at least one oil supply loop is connected to the hydraulic oil consumers.

3. The oil supply device as defined in claim 1, wherein at least one oil supply loop is provided and is connected to the hydraulic oil consumers and at least one oil supply loop is provided and is connected to the lubricating oil consumers, wherein said oil supply loop connected to the hydraulic oil consumers has said at least one self-cleaning filter and at least one high-pressure pumps which are arranged in cascade, and wherein said at least one oil supply loop connected to the lubricating consumers has at least one low-pressure pump.

4. The oil supply device as defined in claim 3, further comprising:
    a branch in said cascade arrangement; and
    at least one filter provided upstream of said branch.

5. The oil supply device as defined in claim 4, wherein said at least one filter provided upstream of said branch is a self-cleaning filter provided with a sludge outlet.

6. The oil supply device as defined in claim 4, wherein the mesh size of said at least one filter is greater than the mesh size of said self-cleaning filter.

7. The oil supply device as defined in claim 6, wherein the mesh size of said at least one filter is approximately eight times the mesh size of said self-cleaning filter.

8. The oil supply device as defined in claim 1, wherein each oil supply loop includes a return line connected outside of said common oil supply.

9. The oil supply device as defined in claim 1, further comprising:
    an oil sump; and
    a return flow line connecting said common oil supply with said oil sump, wherein the leak and return oil accumulating in the area of hydraulic oil consumers is sent to said oil sump.

10. The oil supply device as defined in claim 1, wherein said self-cleaning filter has a mesh size of from 5 $\mu$ to 10 $\mu$.

11. The oil supply device as defined in claim 10, wherein said mesh size is 6 $\mu$.

12. The oil supply device as defined in claim 1, further comprising:
    a separating device including a sediment separator and an upstream located pump.

13. The oil supply device as defined in claim 12, wherein said sediment separator is a centrifuge.

14. The oil supply device as defined in claim 12, wherein said separating device is selectively charged with oil sludge accumulating in the course of fine filtering of oil from said common oil supply.

15. The oil supply device as defined in claim 14, further comprising:
    an aspirating connector inserted into said common oil supply, wherein said separating device further includes a switching device at its inlet which is selectively connected to said aspirating connector.

16. The oil supply device as defined in claim 14, further comprising:
    at least one disposal line of said self-cleaning filter, wherein said separating device further includes a switching device at its inlet which is selectively connected to said at least one disposal line.

17. The oil supply device as defined in claim 16, further comprising:
    a sludge container having a floating switch and a bottom outlet, said sludge container being charged by said at least one disposal line of said self-cleaning filter, wherein said bottom outlet is connected to the bottom of said common oil supply.

18. The oil supply device as defined in claim 16, further comprising:
    a sludge container having a floating switch and a bottom outlet said sludge container being charged by said at least one disposal line of said self-cleaning filter; and
    an aspirating connector, wherein said bottom outlet is connected to said aspirating connector.

19. The oil supply device as defined in claim 18, further comprising:
    a dual valve actuated by said floating switch, wherein said bottom outlet and the bottom of said common oil supply are connected by a flow path from which said aspirating connector extends, and wherein said bottom outlet and the outlet of said common oil supply can be oppositely opened and closed by means of said dual valve.

20. The oil supply device as defined in claim 18, further comprising:
    an overflow device, and wherein said common oil supply and said sludge container are connected by said overflow device.

21. The oil supply device as defined in claim 18, wherein said common oil supply and said sludge container are housed in a common container.

22. The oil supply device as defined in claim 1, further comprising:
   an oil sump; and
   a return flow line connecting said common oil supply with said oil sump, wherein the leak oil accumulating in the area of hydraulic oil consumers is sent to said oil sump.

23. The oil supply device as defined in claim 1, further comprising:
   an oil sump; and
   a return flow line connecting said common oil supply with said oil sump, wherein the return oil accumulating in the area of hydraulic oil consumers is sent to said oil sump.

24. An oil supply device for a reciprocating engine, such as a Diesel engine, having lubricating oil consumers and hydraulic oil consumers, comprising:
   a common oil supply for supplying oil to all consumers;
   an oil supply loop for each oil consumer, each said oil supply loop having at least one pump, at least one filter and a return line, each said oil supply loop and its return line being connected to said common oil supply; and
   a separating device having a sediment outlet and a clean oil outlet terminating in said common oil supply, wherein at least the oil supply loop connected to the hydraulic oil consumers includes at least one self-cleaning filter and a further filter located upstream therefore, wherein the mesh size of said further filter is larger than that of said self-cleaning filter, and wherein each self-cleaning filter has an oil sludge outlet connected to said separating device.

25. An oil supply device for a reciprocating engine, such as a Diesel engine, having lubricating oil consumers and hydraulic oil consumers, comprising:
   a common oil supply for supplying oil to all consumers;
   an oil sump;
   an oil supply loop for each consumer, each said oil supply loop having at least one pump and at least one filter; and
   a return flow line for connecting said oil sump with said common oil supply, wherein the leak and return oil accumulating in the area of the hydraulic oil consumers as well as the leak oil running off the lubricating oil consumers is supplied to said oil sump, wherein at least said oil supply loop leading to the hydraulic oil consumers is provided with a self-cleaning filter, and wherein said oil supply loop leading to the hydraulic oil consumers branches off upstream of said oil supply loop leading to the lubricating oil consumers.

26. An oil supply device for a reciprocating engine, such as a Diesel engine, having lubricating oil consumers and hydraulic oil consumers, comprising:
   a common oil supply for supplying oil to all consumers;
   an oil sump;
   an oil supply loop for each consumer, each said oil supply loop having at least one pump and at least one filter; and
   a return flow line for connecting said oil sump with said common oil supply, wherein the leak accumulating in the area of the hydraulic oil consumers as well as the leak oil running off the lubricating oil consumers is supplied to said oil sump, wherein at least said oil supply loop leading to the hydraulic oil consumers is provided with a self-cleaning filter, and wherein said oil supply loop leading to the hydraulic oil consumers branches off upstream of said oil supply loop leading to the lubricating oil consumers.

27. An oil supply device for a reciprocating engine, such as a Diesel engine, having lubricating oil consumers and hydraulic oil consumers, comprising:
   a common oil supply for supplying oil to all consumers;
   an oil sump;
   an oil supply loop for each consumer, each said oil supply loop having at least one pump and at least one filter; and
   a return flow line for connecting said oil sump with said common oil supply, wherein the return oil accumulating in the area of the hydraulic oil consumers as well as the leak oil running off the lubricating oil consumers is supplied to said oil sump, wherein at least said oil supply loop leading to the hydraulic oil consumers is provided with a self-cleaning filter, and wherein said oil supply loop leading to the hydraulic oil consumers branches off upstream of said oil supply loop leading to the lubricating oil consumers.

* * * * *

UNITED STATES PATENT AND TRADEMARK OFFICE
CERTIFICATE OF CORRECTION

PATENT NO. : 5,816,212
DATED : October 6, 1998
INVENTOR(S) : Henning Lindquist et al It is certified that error appears in the above-indentified patent and that said Letters Patent is hereby corrected as shown below:

Claim 3, column 5, line 51, "pumps" should be --pump--.

Signed and Sealed this

Twenty-eighth Day of September, 1999

Attest:

Q. TODD DICKINSON

Attesting Officer     Acting Commissioner of Patents and Trademarks

UNITED STATES PATENT AND TRADEMARK OFFICE
CERTIFICATE OF CORRECTION

PATENT NO. : 5,816,212
DATED : Oct. 6, 1998
INVENTOR(S) : Henning Lindquist, et al It is certified that error appears in the above-identified patent and that said Letters Patent is hereby corrected as shown below:

On the title page, under [75] both inventors should be identified as --both of Dane--

Signed and Sealed this

Eighteenth Day of April, 2000

Attest:

Q. TODD DICKINSON

*Attesting Officer*             *Director of Patents and Trademarks*